UNITED STATES PATENT OFFICE.

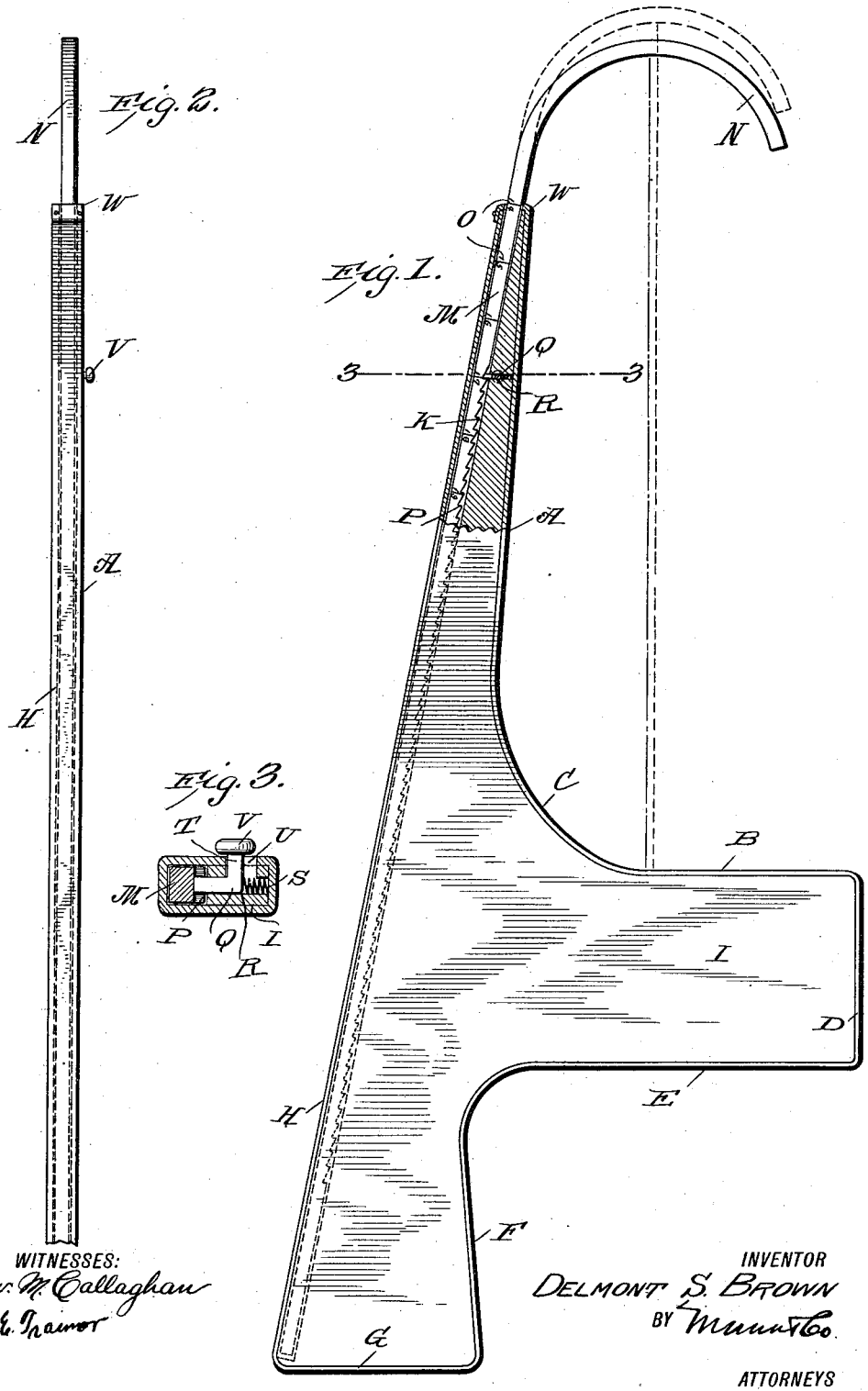

DELMONT S. BROWN, OF WATERTOWN, NEW YORK.

DEVICE FOR MEASURING DRAFT-ANIMALS FOR COLLARS.

1,031,519.  Specification of Letters Patent.  Patented July 2, 1912.

Application filed March 7, 1911. Serial No. 612,956.

*To all whom it may concern:*

Be it known that I, DELMONT S. BROWN, a citizen of the United States, and a resident of Watertown, county of Jefferson, and State of New York, have invented certain new and useful Improvements in Devices for Measuring Draft-Animals for Collars, of which the following is a specification.

My invention is an improvement in devices for measuring draft animals for collars, and consists in certain novel constructions and combinations of parts, hereinafter described and claimed.

The object of the invention is to provide a simple and inexpensive device of the character specified, by means of which the exact measurement of the neck of the draft animal may be obtained.

Referring to the drawings forming a part hereof, Figure 1 is a front view of the improvement, with parts thereof broken away. Fig. 2 is a partial edge view, and, Fig. 3 is a section on the line 3—3 of Fig. 1.

The embodiment of the invention shown in the drawings comprises a frame composed of a strip of iron or like rigid material, bent to form a substantially vertical portion A, and a horizontal portion B, connected to the vertical portion by a curved portion C. The strip is then bent vertically at D and horizontally at E substantially parallel with the portion B, and again vertically at F, in substantial alinement with the portion A, then horizontally at G, and thence upwardly at H, at a slight angle to the portion A, to a connection with the upper end of the said portion A. A filling I, of wood, or like rigid material, is arranged within the frame, and assists in holding the frame in proper shape, so that the said frame, while composed of light material, will be sufficiently rigid and strong enough for the purpose for which it is intended.

The frame consists essentially of the portions A and B, the latter acting as a stop or gage for engaging the under surface of the animal's neck, and the former as a stop or gage for engaging the side of the neck. The portions F and G of the frame serve as a handle, for convenience in manipulating the device.

The filling I is grooved or recessed at K, adjacent to the portion H of the frame, and the full length of the said portion, and a rod or bar M is slidable in the said recess. The upper end of the bar is bent into an arc or hook N for engaging over the horse's neck, and one side thereof is provided with a scale O, while one edge, the inner, is provided with a series of ratchet teeth P. A catch Q is arranged in a recess R in the filling, and is adapted for engagement with the teeth. The catch is normally pressed toward the teeth by a spring S, and is provided with an angular portion T extending outwardly through a slot U in the filling, and having a knob or button V, for convenience in manipulating the catch. The ratchet teeth face upwardly, so that the bar may not be moved upwardly or withdrawn from the recess without first releasing the catch. The spring is of sufficient strength to hinder the free inward movement of the bar of its own might, so that when adjusted, the bar will hold its position against accidental displacement. It will be noticed that the bar is inclined with respect to the perpendicular in all positions of the bar, and the relation of the parts is such that in all positions of the bar, a perpendicular from the center of the arc or hook N to the gage B, will approximately coincide with the vertical central line of the horse's neck. This is true, whatever the size of the neck, for it will be evident that as the length of the perpendicular increases its distance from the portion A of the frame will increase in proportion, as indicated by the full and dotted lines in Fig. 1, that is, as the hook moves away from the gage B, it also moves laterally with respect to the gage A. The scale O indicates the size of collar, the upper end W of the frame coöperating therewith as an indicator.

When not in use, the device may be hung up, by engaging the hook N with a nail, or the like, the catch preventing withdrawal of the bar.

In operation, the device is held by the handle, and the bar M is withdrawn a sufficient distance and hooked over the animal's neck. The gage A is laid alongside the neck, and the frame is moved upwardly until the gage B engages the under surface of the neck. The frame may now be swung laterally, and the hook removed. The size of collar will be indicated on the scale.

It will be evident that the essential elements of the combination are the gage B, and the hook or arc having a limited and guided longitudinal and lateral movement with respect to the gage.

The bar M is preferably of sufficient length to permit the correct measurement of all sizes, from the largest to the smallest animal, and it will be evident that many changes may be made in the construction without departing from the spirit of the invention.

I claim:

1. A device of the character specified, comprising a frame having sides inclined toward each other and meeting at one end of the frame, one of the said sides having a laterally extending lug intermediate its ends, and the other side being recessed longitudinally, a bar slidable in the recess and extending beyond the frame at the junction of the sides, and having an arc-shaped hook at its outer end, a series of ratchet teeth on the inner edge of the bar, said teeth facing the hook, a pawl mounted for sliding movement in the frame toward and from the bar for engaging the ratchet teeth to hold the bar in extended position, a spring pressing the pawl toward the bar, and means in connection with the bar and the frame for indicating the distance between the hook and the lug.

2. A device of the character specified, comprising a frame having sides inclined toward each other and meeting at one end of the frame, one of the said sides having a laterally extending lug intermediate its ends, and the other side being recessed longitudinally, a bar slidable in the recess and extending beyond the frame at the junction of the sides, and having an arc-shaped hook at its outer end, a series of ratchet teeth on the inner edge of the bar, said teeth facing the hook, a pawl mounted for sliding movement in the frame toward and from the bar for engaging the ratchet teeth to hold the bar in extended position, and a spring pressing the pawl toward the bar.

DELMONT S. BROWN.

Witnesses:
LESLIE E. BATES,
GEORGE G. BATES.

---

Copies of this patent may be obtained for five cents each, by addressing the "Commissioner of Patents, Washington, D. C."